(12) United States Patent
Smith et al.

(10) Patent No.: US 11,520,646 B2
(45) Date of Patent: Dec. 6, 2022

(54) METHOD FOR IMPROVING OPERATIONAL INTEGRITY OF IOT DEVICE

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 16/609,409

(22) PCT Filed: Dec. 29, 2017

(86) PCT No.: PCT/US2017/069054
§ 371 (c)(1),
(2) Date: Oct. 29, 2019

(87) PCT Pub. No.: WO2018/208331
PCT Pub. Date: Nov. 15, 2018

(65) Prior Publication Data
US 2020/0097353 A1    Mar. 26, 2020

Related U.S. Application Data

(60) Provisional application No. 62/503,783, filed on May 9, 2017.

(51) Int. Cl.
*G06F 11/14* (2006.01)
*G06F 11/07* (2006.01)
(Continued)

(52) U.S. Cl.
CPC ............ *G06F 11/0709* (2013.01); *G06F 1/24* (2013.01); *G06F 9/4401* (2013.01);
(Continued)

(58) Field of Classification Search
CPC ............ G06F 11/1441; G06F 11/1417; G06F 11/1438; G06F 9/4401; G06F 21/131; G06F 21/53; G06F 21/575; G06F 1/24
See application file for complete search history.

(56) References Cited

U.S. PATENT DOCUMENTS

| 8,826,013 B1 * | 9/2014 | Kodukula ............... G06F 21/53 707/823 |
| 2003/0028812 A1 * | 2/2003 | Stultz .................... G06F 21/575 726/2 |

(Continued)

FOREIGN PATENT DOCUMENTS

WO    WO-2018208331 A1    11/2018

OTHER PUBLICATIONS

"International Application Serial No. PCT/US2017/069054, International Search Report dated Apr. 25, 2018", 6 pgs.
(Continued)

*Primary Examiner* — Yolanda L Wilson
(74) *Attorney, Agent, or Firm* — Schwegman Lundberg & Woessner, P.A.

(57) ABSTRACT

Various systems and methods for implementing a soft reset state. A server device includes processing circuitry; and at least one storage device including instructions embodied thereon, wherein the instructions, which when executed by the processing circuitry, configure the processing circuitry to perform operations of a soft reset operation, the operations to: define a soft reset state; cause a check of a secure virtual resource (SVR) of the server device, while in the soft reset state; and transition from the soft reset state in response to an event.

27 Claims, 13 Drawing Sheets

(51) Int. Cl.
*G06F 1/24* (2006.01)
*G06F 9/4401* (2018.01)
*G06F 21/31* (2013.01)
*G06F 21/53* (2013.01)
*G06F 21/57* (2013.01)
*H04L 67/00* (2022.01)

(52) U.S. Cl.
CPC ...... *G06F 11/0793* (2013.01); *G06F 11/1441* (2013.01); *G06F 21/31* (2013.01); *G06F 21/53* (2013.01); *G06F 21/575* (2013.01); *H04L 67/34* (2013.01)

(56) References Cited

U.S. PATENT DOCUMENTS

| | | | | |
|---|---|---|---|---|
| 2004/0268109 | A1* | 12/2004 | Rothman | G06F 9/4401 713/1 |
| 2009/0319782 | A1* | 12/2009 | Lee | G06F 21/575 713/172 |
| 2012/0042215 | A1 | 2/2012 | Murayama et al. | |
| 2012/0311117 | A1* | 12/2012 | Fulop | G06F 9/45558 709/223 |
| 2013/0046981 | A1 | 2/2013 | Ducharme et al. | |
| 2014/0189339 | A1* | 7/2014 | Gehrmann | G06F 21/53 713/100 |
| 2015/0087291 | A1 | 3/2015 | Mohammed et al. | |
| 2018/0314827 | A1* | 11/2018 | Wells | G06F 9/45558 |
| 2019/0018689 | A1* | 1/2019 | Buendgen | G06F 9/4401 |

OTHER PUBLICATIONS

"International Application Serial No. PCT/US2017/069054, Written Opinion dated Apr. 25, 2018", 9 pgs.

"OIC Security Specification V1.1.0", Open Connectivity Foundation (OCF), (Dec. 31, 2016), 102.

"International Application Serial No. PCT US2017 069054, International Preliminary Report on Patentability dated Nov. 21, 2019", 11 pgs.

* cited by examiner

METHOD FOR IMPROVING OPERATIONAL INTEGRITY OF IOT DEVICE

PRIORITY CLAIM

This application is a U.S. National Stage Application under 35 U.S.C. 371 from International Application No. PCT/US2017/069054, filed Dec. 29, 2017, 2017, published as WO 2018/208331, which claims the benefit of priority to U.S. Application Ser. No. 62/503,783, filed. May 9, 2017, all of which are incorporated herein by reference in their entirety.

TECHNICAL FIELD

Embodiments described herein generally relate to processing techniques used with data communications and interconnected device networks, and in particular, to techniques applied within internet of things (IoT) devices and device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
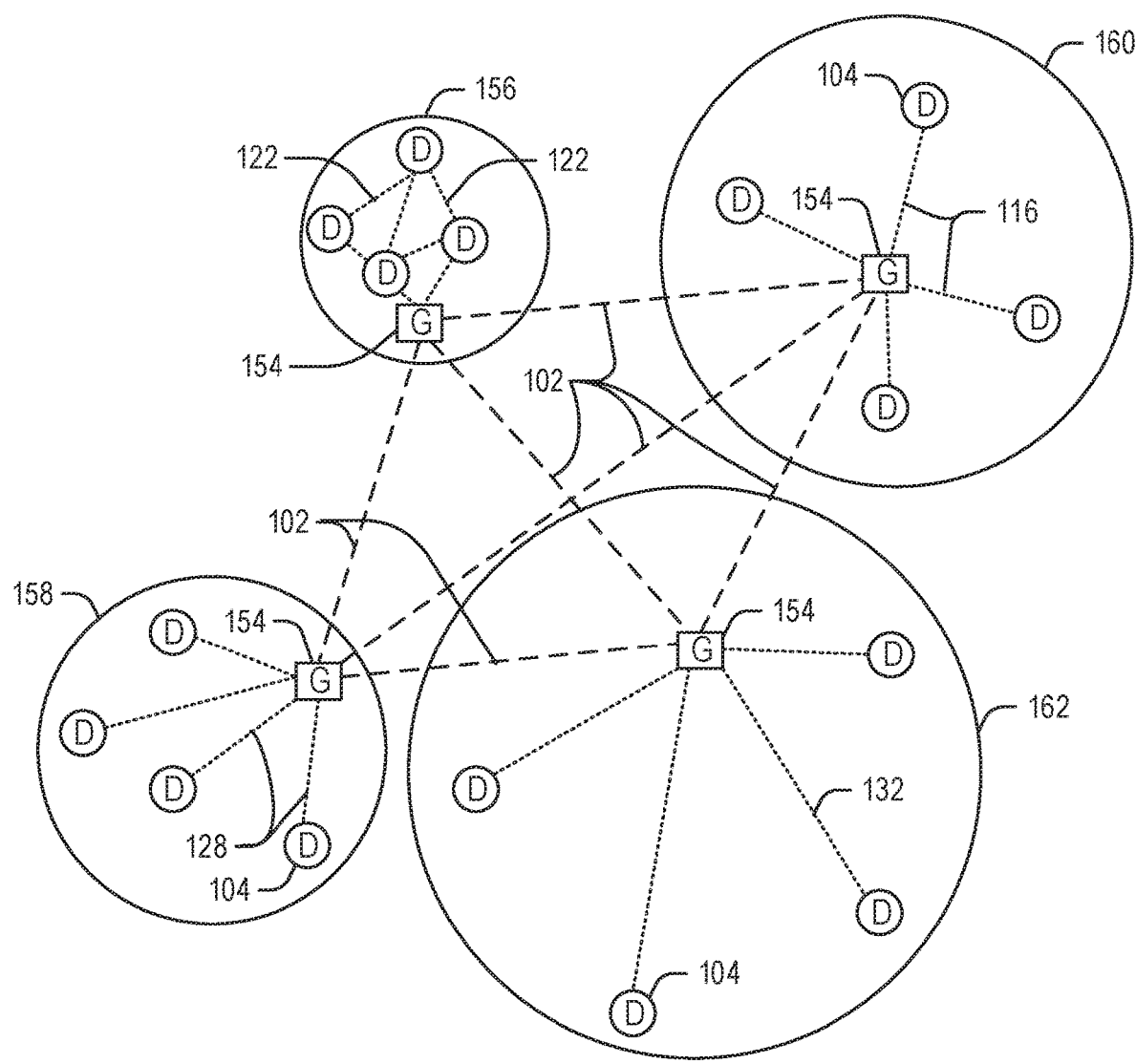
FIG. 1 illustrates an domain topology for respective internet-of-things (IoT) networks coupled through links to respective gateways, according to an example.

In the following description, methods, configurations, and related apparatuses are disclosed for the processing of security contexts in an IoT device interconnection setting through the use of a state model that is part of a device's object model.

The techniques discussed herein include a model that has five states, though operation with fewer or additional states may be applied safely. The five states include: a Reset state (also referred to as a "full reset" or "hard reset" state); a Ready-For-Onboarding (RFO) state (also referred to as a Ready-For-Ownership-Transfer-Method (RFOTM) state); a Ready-For-Provisioning (RFP) state; a Ready-For-Normal-Operation (RFNOP) state, and a Soft Reset (SRESET) state.

The Reset state is used for transitioning the device through device onboarding, which may involve limiting discoverability and where device function may be severely restricted.

The Ready-For-Onboarding state is used for transitioning the device into a deployment environment where trust, security and safety requirements associated with an operational environment can be assessed in the context of device's reliability, safety, security and other characteristics.

The Ready-For-Provisioning state is used for transitioning the device into an operational mode where access to application resources and normal operations is severely restricted, but where access to deployment, security and failsafe operation can be configured and adjusted.

The Ready-For-Normal-Operation state is used for transitioning to normal operations where interactions involving peer devices may permitted.

The Soft Reset state is used for transitioning to a reset state where a device owner can fully re-configure and re-deploy the device without losing ownership context (that is the expected consequence of a full Reset). Soft reset allows remote and "over-the-wire" re-configuration which avoids costly manual interactions.

IoT devices often bridge IT and OT worlds. Operational integrity failure may result in greater harm than IT-only scenarios where loss of life, physical harms, and property or environmental damage may result.

Many IoT applications are designed to manage state transitions where safe and unsafe state definition are part of the application design philosophy and tooling. However, these states rely on integral operation of the IoT device within a device lifecycle. Lifecycle failures may translate to operational failures.

The systems and methods described in this document define a device lifecycle state model that, as a feature of an IoT framework (such as OCF) may be followed by a large body of devices all expecting to interact with each other in the context of well-behaved device states.

Existing solutions make simplifying assumptions about the state of the device and deployment. Typically, a vendor supplies a proprietary deployment and management infrastructure that is trusted to manage and keep track of device state. These may be thought of as centralized device state management systems.

An application or operating system has limited scope when it comes to understanding device lifecycle status.

A challenge facing proprietary, centralized approaches is the device is not self-aware of what constitutes a safe device lifecycle state. Centrally managed lifecycle means the device may not be aware of an expected device state when the connection to the central entity is broken. Proprietary solutions also suffer when devices exist in heterogeneous deployments; each system is different and devices cannot agree on whether a peer device is in a meaningful device state.

Using the five-state model described herein, IoT devices are self-aware of their device state making it possible for devices to be pro-active about obtaining help necessary for transitioning to the next state. Devices have the appearance of being 'smarter' because they may facilitate recovery from failure or malicious events. In addition, IoT devices are resistant to catastrophic failure because device state ensures operationally device behaviors are contained within the device states. Special hardware may be helpful in ensuring device states are not easily overridden.

Other IoT devices and support services may introspect and assess devices according to device state awareness. This may be used by network management infrastructure to create network enclaves for devices different states (where devices autonomously assign themselves to an appropriate enclave). Automation reduces administrative cost and overhead while maintaining good operational integrity and security. Further details are provided in the following figures and associated discussion.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often. IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
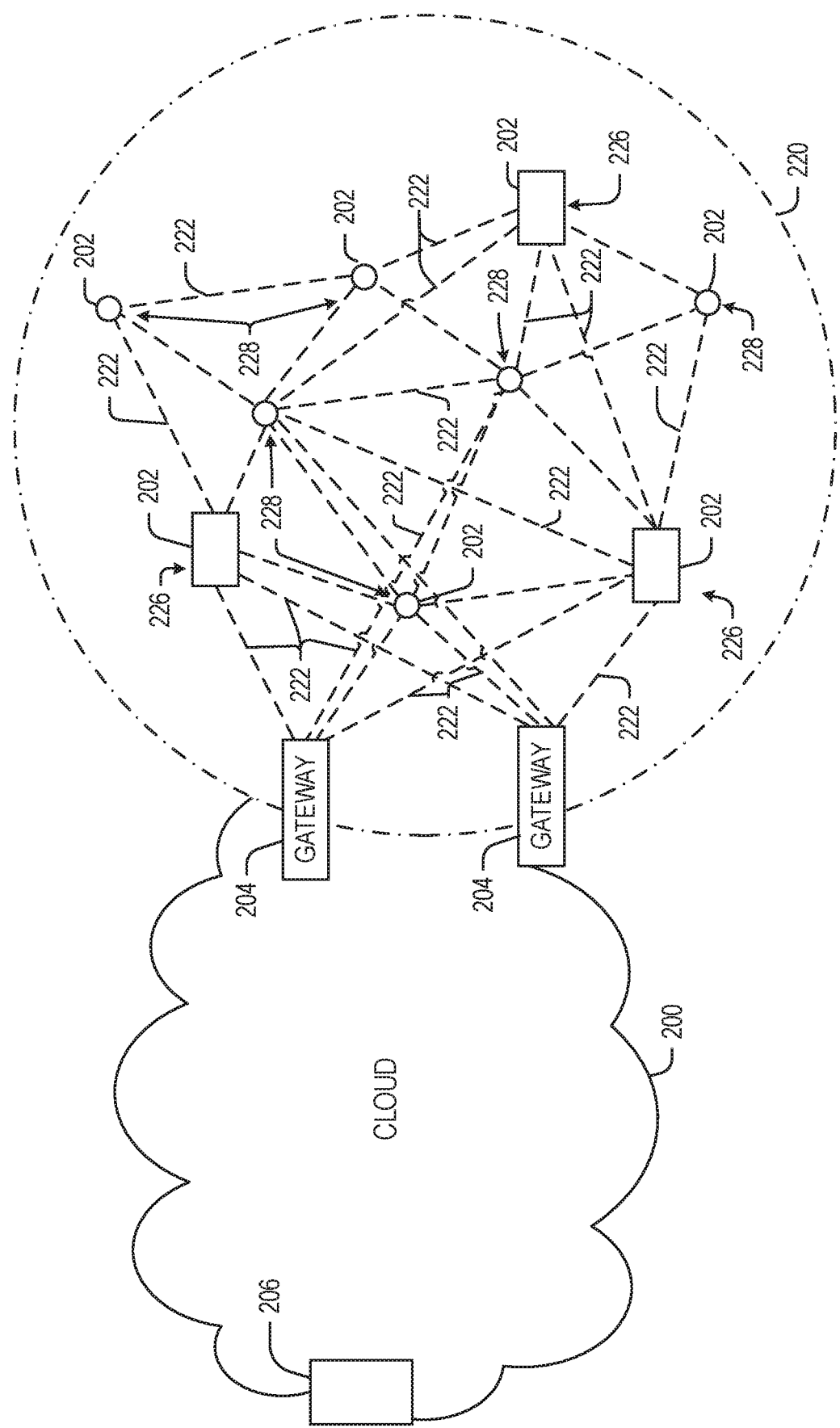
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 12 and 13.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200. e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Various techniques for improving operational integrity of an IoT device in a connected device framework are described in the following sections with reference to FIGS. 3 to 11. Specifically, some of the device framework and terminology discussed in the following examples is provided within specifications defined by the OCF family of standards (e.g., the OCF Specification 1.0 and later versions). However, it will be understood that the following techniques may be applicable to other specifications and families of standards, in addition to proprietary and non-standard implementations.

In an OCF architecture, entities in the real physical world (e.g., a temperature sensor) are represented as resources. Interactions with entities are implemented through resource representations, which use operations that adhere to Representational State Transfer (REST) architectures, e.g., RESTful interactions. As such, entities are exposed as resources, each with their unique identifiers (URIs) and support interfaces that enable RESTful operations on their resources. A client initiates a RESTful operation on a server. The client is the initiator and the server is a responder. Any device may act as a client to initiate a RESTful operation or any other device acting as a server. Thus, the role of a device as a client or server, in many circumstances, may be interchangeable. Any device that exposes a resource is by definition, a server. Each RESTful operation contains all of the information needed to understand the context of the operation and is supported by a set of generic operations (e.g., CREATE. RETRIEVE, UPDATE, DELETE, and NOTIFY (CRUDN)).

As discussed herein, the following techniques may be implemented in connection with use of various OCF services, including DOXS (also known as DOTS, Device Owner Transfer Service). In a further example, the following techniques may be implemented in connection with an onboarding tool (OBT). In the context of an OCF implementation, an OBT is an logical entity within a specific IoT network that establishes ownership for a specific device and helps bring the device into operational state within that network. For instance, a typical OBT may implement DOXS, AMS (Access Management Service), and CMS (Credential Management Service) functionality.

Figure 3:
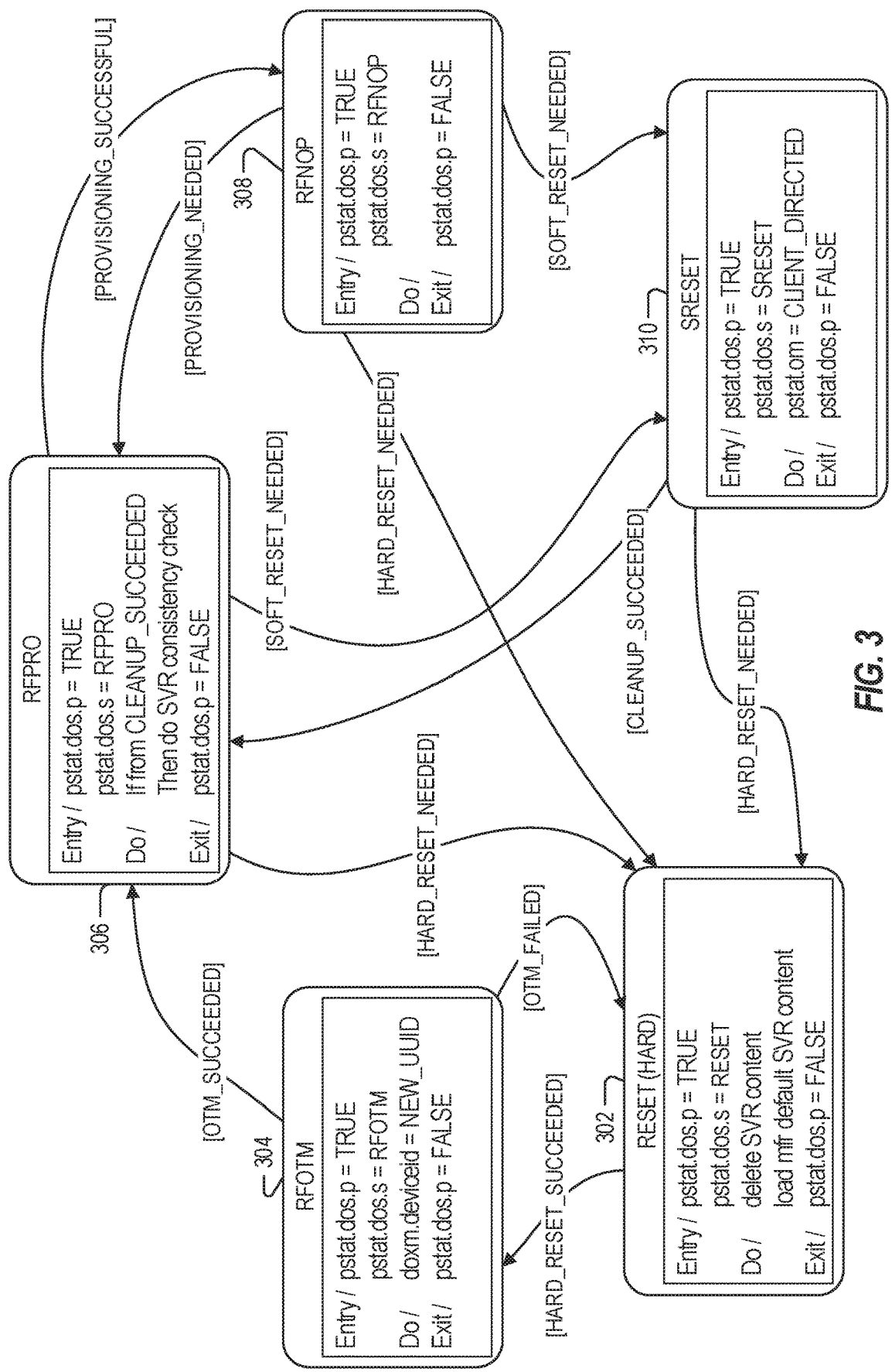
FIG. 3 illustrates a system state model with transition criteria, according to an embodiment.

FIG. 3 illustrates a system state model 300 with transition criteria, according to an embodiment. The system state model 300 includes five states: a RESET state 302; a Ready-For-Onboarding (also referred to as Ready for Ownership Transfer (RFOTM)) state 304; a Ready-For-Provisioning (RFPRO) state 306; a Ready-For-Normal-Operation (RFNOP) state 308, and a Soft Reset (SRESET) state 310.

Each state 302-310 includes an "entry" procedure, a "do" procedure, and an "exit" procedure. The entry procedure is performed upon entry into the particular state. The do procedure is performed when the state is active. The exit procedure is performed when control is being transitioned to another state.

A device state transition controller may be used to perform some or all of the procedures in a state, control transition between states, and the like. The device state transition controller may be a trusted execution environment (TEE) or other isolated execution environment (e.g., Intel SGX. Intel TrustLite, ARM TrustZone, etc.).

The device includes the following resources (e.g., security virtual resources):

1) /oic/sec/doxm (device owner transfer method) resource
2) /oic/sec/pstat (provisioning status) resource
3) /oic/sec/cred (credential) resource
4) /oic/sec/svc (security services) resource Upon entering a hard RESET state 302, the properties for the provisioning status "pstat" resource are set, such that the device onboarding state's pending state value is Boolean TRUE (pstat.dos.p=TRUE) and the device onboarding state's onboarding state indicates a hard reset (pstat.dos.s=RESET). Once in RESET state 302, the security virtual resource (SVR) content of the device is deleted and the manufacturer's default SVR is loaded. When the reset is completed successfully, control passes to RFOTM state 304. Upon state transition to RFOTM state 304, the device onboarding state's pending state is set to Boolean FALSE (pstat.dos.p=FALSE).

Upon entering RFOTM state 304, the properties for the provisioning status "pstat" resource are set, such that the device onboarding state's pending state value is Boolean TRUE (pstat.dos.p=TRUE) and the device onboarding state's onboarding state indicates a hard reset (pstat.dos.s=RFOTM). Once in RFOTM state 304, a new UUID is assigned to the doxm resource's deviceid property (doxm.deviceid=NEW_UUID). If the ownership transfer method (OTM) fails, then the control is transferred back to the RESET state 302 and the device onboarding state's pending state is set to Boolean FALSE (pstat.dos.p=FALSE). If the OTM succeeds, then control is transferred to RFPRO state 306 and the device onboarding state's pending state is set to Boolean FALSE (pstat.dos.p=FALSE).

Upon entering RFPRO state 306, the properties for the provisioning status "pstat" resource are set, such that the device onboarding state's pending state value is Boolean TRUE (pstat.dos.p=TRUE) and the device onboarding state's onboarding state indicates a hard reset (pstat.dos.s=RFPRO). Once in RFPRO state 306, a consistency check is performed on the SVR if the control to RFPRO state 306 was from SRESET state 310. When control is in the RFPRO state 306, if a soft reset is needed, then control transfers to SRESET state 310 for a soft reset. If a hard reset is needed, the control transfers to RESET state 302 for a hard reset. Otherwise, when provisioning succeeds, the control passes to RFNOP state 308. The device onboarding state's pending state is set to Boolean FALSE (pstat.dos.p=FALSE) upon exiting the RFPRO state 306.

Upon entering RFNOP state 308, the properties for the provisioning status "pstat" resource are set, such that the device onboarding state's pending state value is Boolean TRUE (pstat.dos.p=TRUE) and the device onboarding state's onboarding state indicates a hard reset (pstat.dos.s=RFNOP). Once in RFNOP state 308, normal operations may commence and the resource may be used by subjects according to security controls (e.g., an ACL). When control is in the RFNOP state 308, if a soft reset is needed, then control transfers to SRESET state 310 for a soft reset. If a hard reset is needed, the control transfers to RESET state 302 for a hard reset. Otherwise, the control passes to RFPRO state 306 when the resource needs provisioning. The device onboarding state's pending state is set to Boolean FALSE (pstat.dos.p=FALSE) upon exiting the RFNOP state 308.

Upon entering SRESET state 310, the properties for the "pstat" resource are set, such that the device onboarding state's pending state value is Boolean TRUE (pstat.dos.p=TRUE) and the device onboarding state's onboarding state indicates a hard reset (pstat.dos.s=SRESET). Once in SRESET state 310, the operational mode is set to be client directed (pstat.om=CLIENT_DIRECTED). If a hard reset is needed, the control transfers to RESET state 302 for a hard reset. Otherwise, after the soft reset, the device is ready for provisioning and control passes to RFPRO state 306 where a consistency check is performed. The device onboarding state's pending state is set to Boolean FALSE (pstat.dos.p=FALSE) upon exiting the SRESET state 310.

Figure 4:
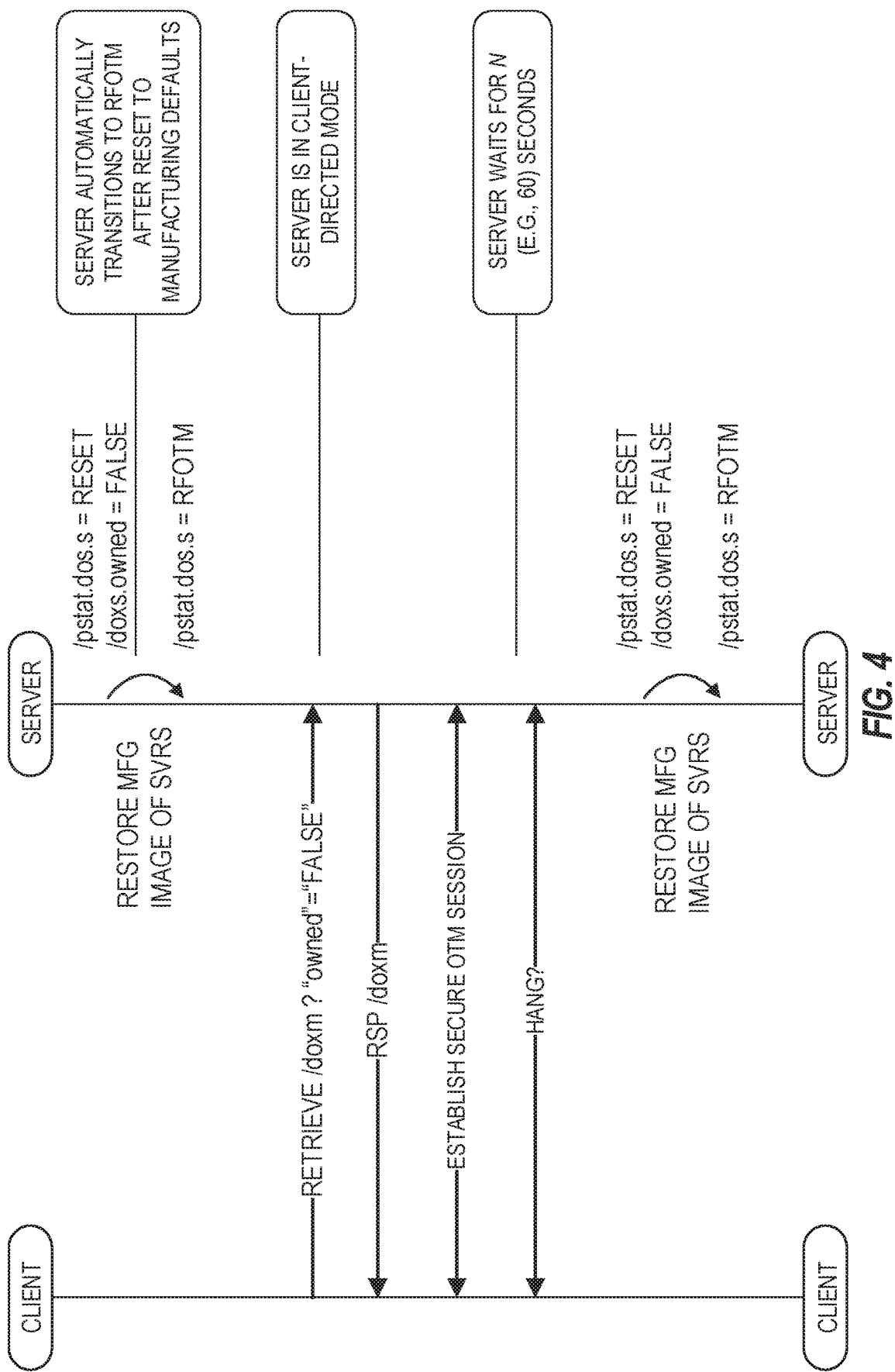
FIG. 4 is a control and data flow sequencing diagram for a hard reset state, according to an embodiment.

FIG. 4 is a control and data flow sequencing diagram for a hard reset state, according to an embodiment. OCF resources may be affected in the following ways.

Upon transition into RESET state 302:
a. Server sets/doxm.owned=FALSE
b. Server sets/doxm.devowneruuid="00000000-0000-0000-0000-000000000000"
c. Server sets/doxm.deviceuuid=<a random non-repeating UUID>
d. Server sets/doxm.oxmsel=4 (oic.sec.oxm.self)
e. Server sets/doxm.rowneruuid="00000000-0000-0000-0000-000000000000"
f. Server sets/pstat.isop=FALSE
g. Server sets/pstat.cm=00000001
h. Server sets/pstat.tm=00000010
i. Server sets/pstat.om=<mfg_def>
j. Server sets/pstat.rowneruuid="00000000-0000-0000-0000-000000000000"
k. Server sets/acl.rowneruuid="00000000-0000-0000-0000-000000000000"
l. Server sets/acl2.rowneruuid="00000000-0000-0000-0000-000000000000"
m. Server sets/cred.rowneruuid="00000000-0000-0000-0000-000000000000"

In the transition to the RFOTM state 304, all values are the same except for the following:
a. Server sets/pstat.dos.s=RFOTM
b. Server sets/pstat.cm=XXXXXX10
c. Server sets/pstat.tm=XXXXXX00

Figure 5:
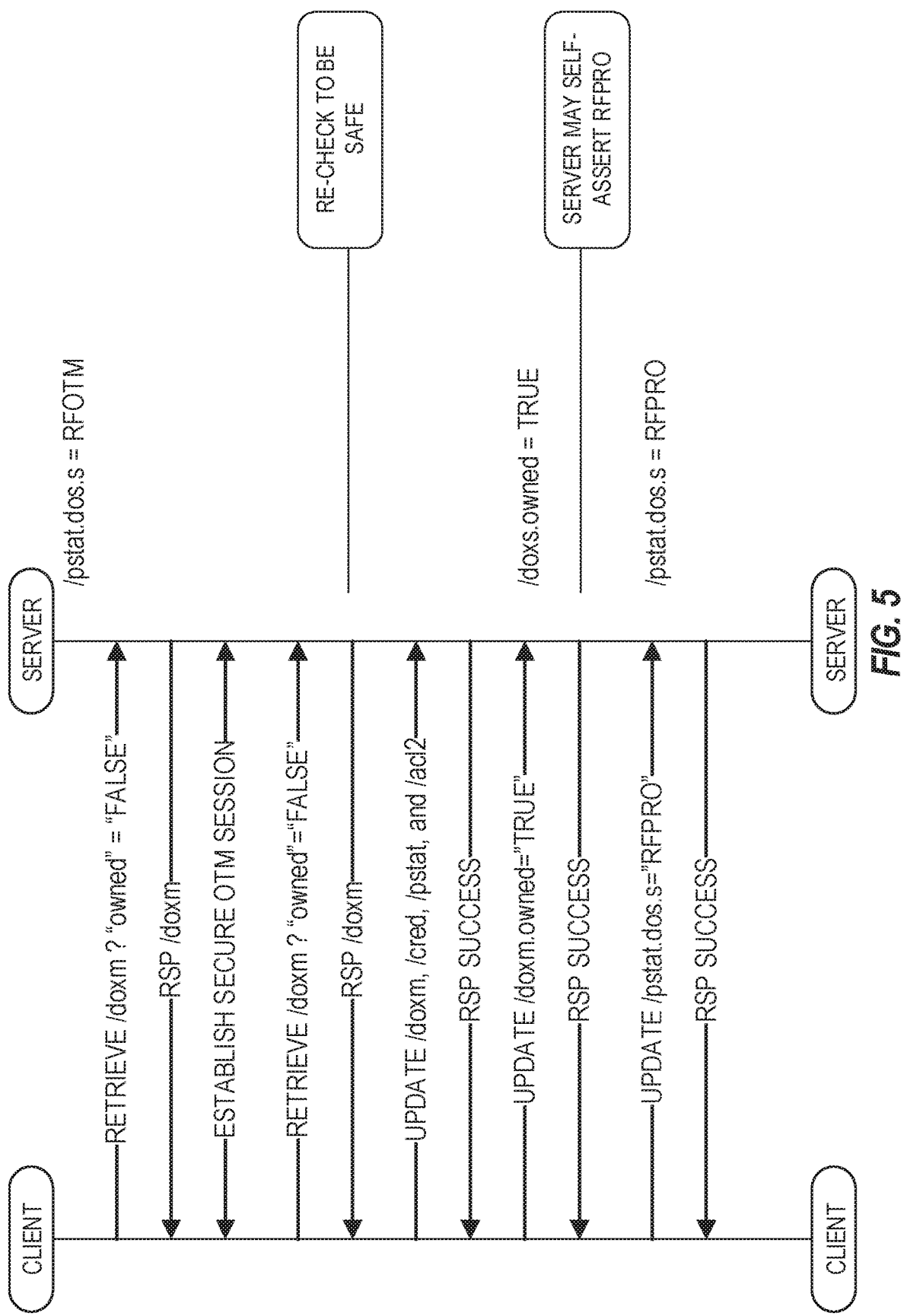
FIG. 5 is a control and data flow sequencing diagram for transitioning from a Ready-for-Owner-Transfer-Method (RFOTM) state to a Ready-for-Provisioning (RFPRO) state, according to an embodiment.
Figure 6:
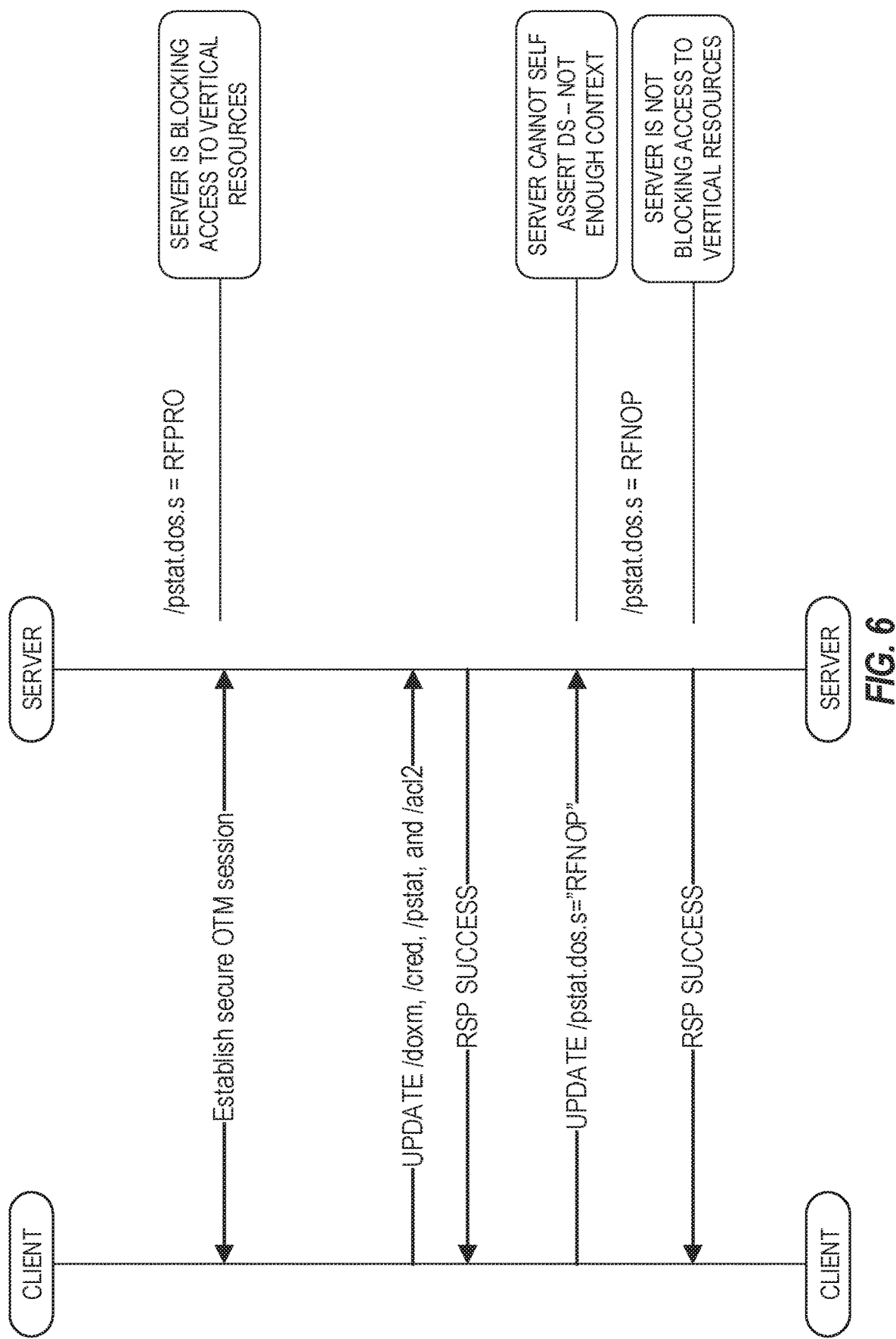
FIG. 6 is a control and data flow sequencing diagram for transitioning from a Ready-for-Provisioning (RFPRO) state to a Ready-for-Normal-Operation (RFNOP) state, according to an embodiment.
Figure 7:
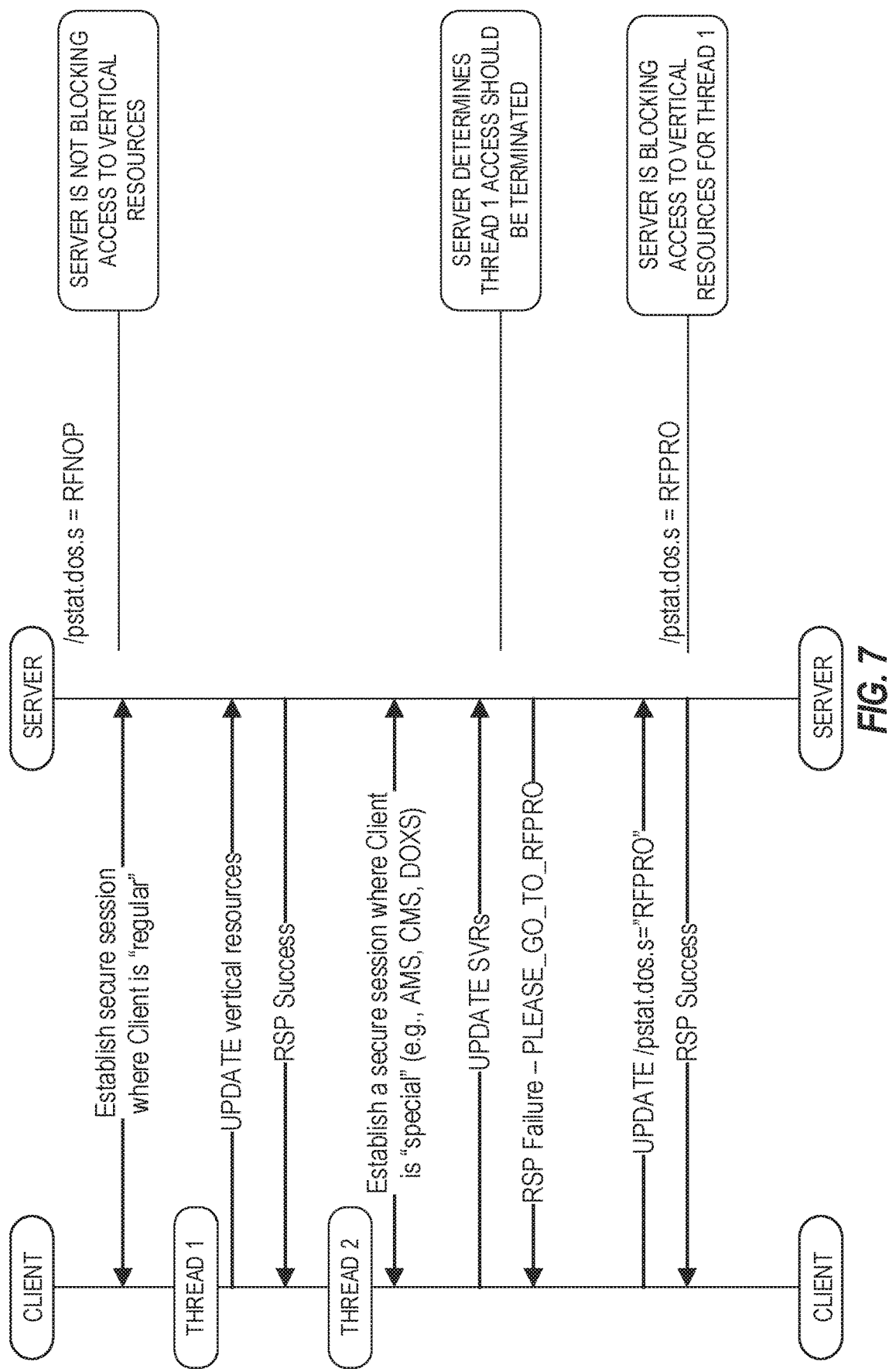
FIG. 7 is a control and data flow sequencing diagram for transitioning from a Ready-for-Normal-Operation (RFNOP) state to a Ready-for-Provisioning (RFPRO) state, according to an embodiment.
Figure 8:
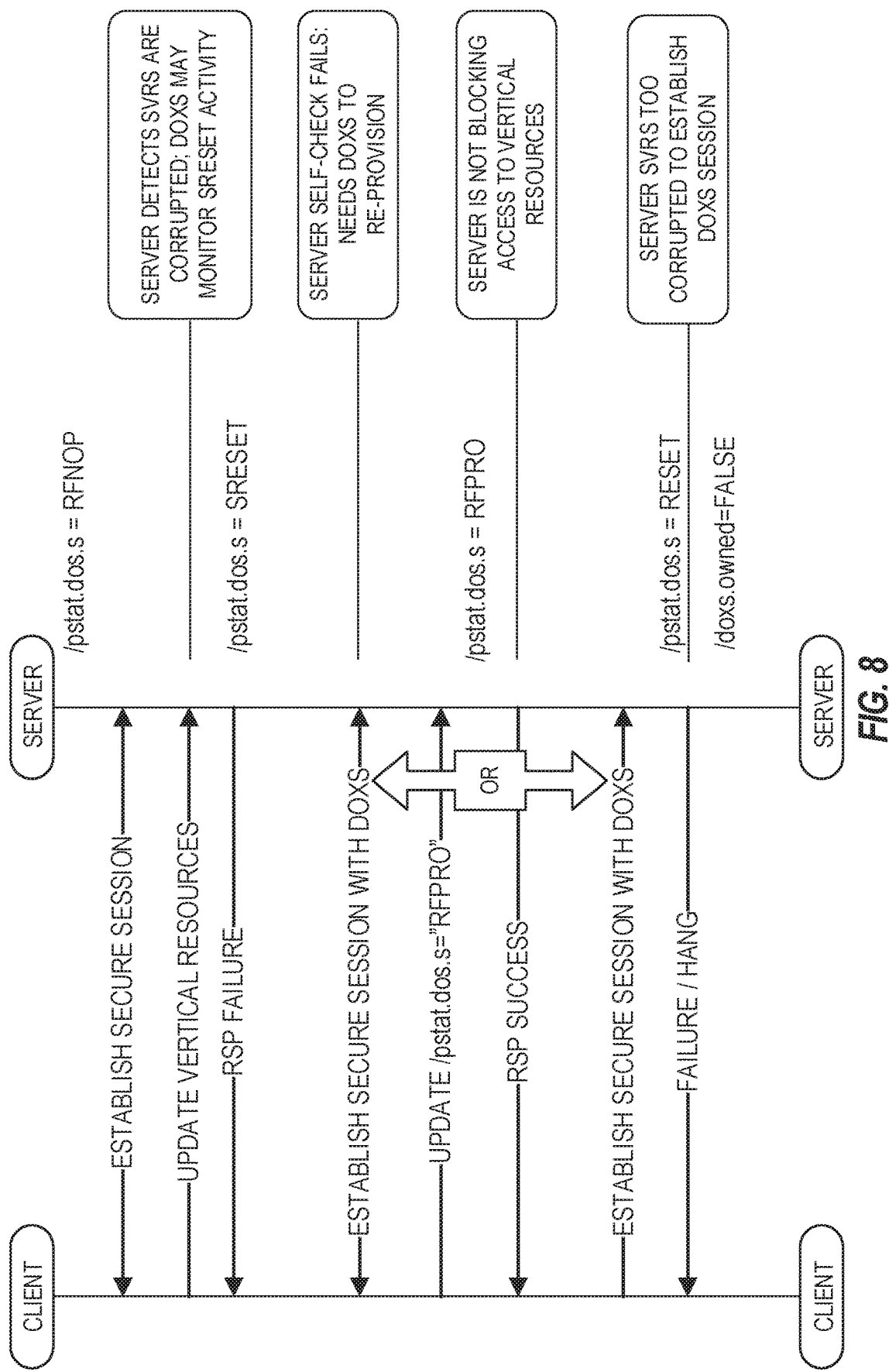
FIG. 8 is a control and data flow sequencing diagram for transitioning from any state to a Soft Reset (SRESET) state, according to an embodiment.

FIG. 5 is a control and data flow sequencing diagram for transitioning from RFOTM state 304 to RFPRO state 306, according to an embodiment. OCF resources may be affected in the following ways. All values remain as they were when transitioning into RFOTM except as follows:
a. DOXS sets/doxm.owned=TRUE
b. DOXS sets/doxm.devowneruuid=<DOXS_UUID>
c. DOXS sets/doxm.deviccuuid=<NEW_UUID> OR Server sets to a persistent UUID.
d. DOXS sets/doxm.oxmsel=<The selected OTM>
e. Server sets/pstat.cm=XXXXXX00
f. DOXS sets/doxm.rowneruuid=<DOXS_UUID> (or other as determined by DOXS)
g. DOXS sets/pstat.rowneruuid=<DOXS_UUID> (or other as determined by DOXS)
h. DOXS sets/cred.rowneruuid=<CMS_UUID> (or other as determined by DOXS)
i. DOXS sets/acl.rowneruuid=<AMS_UUID> (or other as determined by DOXS)
j. DOXS sets/acl2.rowneruuid=<AMS_UUID> (or other as determined by DOXS)
k. DOXS sets/cred.creds=AMS and CMS credentials
l. DOXS sets/acl2.aces=AMS and CMS and other ACES as needed.
m. DOXS sets/pstat.dos.s=RFPRO FIG. 6 is a control and data flow sequencing diagram for transitioning from RFPRO state 306 to RFNOP state 308, according to an embodiment. OCF resources may be affected in the following ways:
a. DOXS creates and/or initializes SVRs as needed
b. CMS provisions credentials into/cred.creds as needed
c. AMS provisions ACEs into /acl, /acl2. /amacl and/sacl as needed
d. DOXS, CMS or AMS sets/pstat.dos.s=RFNOP
e. Server sets/pstat.isop=TRUE FIG. 7 is a control and data flow sequencing diagram for transitioning from RFNOP state 308 to RFPRO state 306, according to an embodiment. OCF resources may be affected in the following ways:
a. Device's access vertical resources permitted
b. DOXS. AMS or CMS sets/pstat.dos.s=RFPRO
c. Server sets/pstat.isop=FALSE FIG. 8 is a control and data flow sequencing diagram for transitioning from any state to SRESET state 310, according to an embodiment. OCF resources may be affected in the following ways:
a. DOXS, AMS or CMS set/pstat.dos.s=SRESET OR Server sets /pstat.dos.s=SRESET
b. Server sets/pstat.isop=FALSE
c. Vertical resources are inaccessible
d. DOXS creates/initializes SVRs as needed
e. DOXS sets/pstat.dos.s=RFPRO OR RESET OR Server sets /pstat.dos.s=RESET (after DOXS connection failure)

Figure 9:
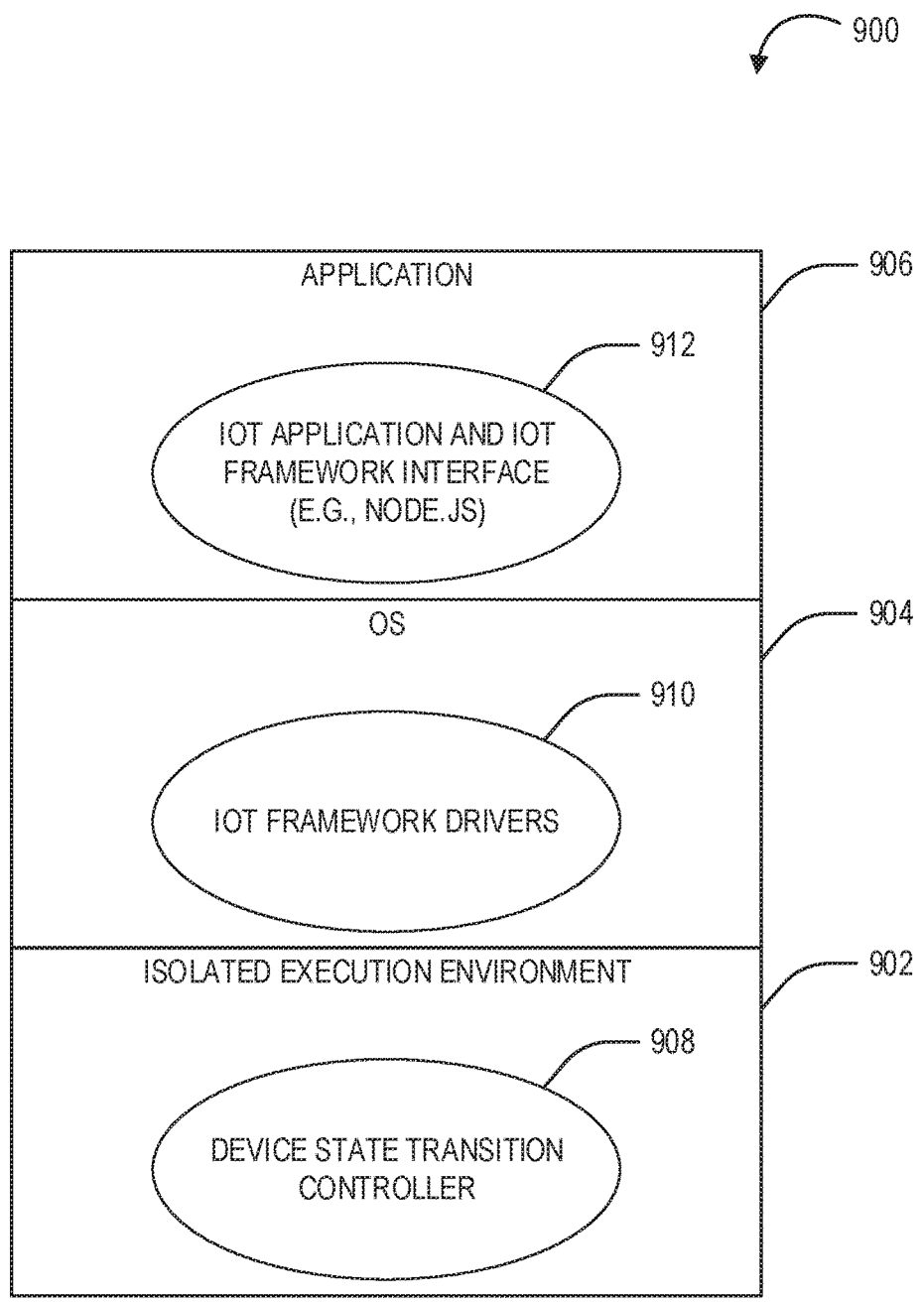
FIG. 9 is a diagram illustrating the framework used for an apparatus to perform state manipulation in a hardware isolated execution environment, according to an embodiment.

FIG. 9 is a diagram illustrating the framework used for an apparatus to perform state manipulation in a hardware isolated execution environment, according to an embodiment. The framework 900 includes a hardware isolated execution environment layer 902 with an operating system layer 904 stacked on top of it, and an application layer 906 on top of the operating system layer 904.

The hardware isolated execution environment layer 902 may be implemented with Intel SGX, Intel ME. Intel TrustLite, ARM TrustZone, and the like. The hardware isolated execution environment 902 includes a device state transition controller 908. The operating system layer 904 includes IoT framework drivers 910. The application layer 906 includes IoT applications and IoT framework interfaces 912.

Figure 10:
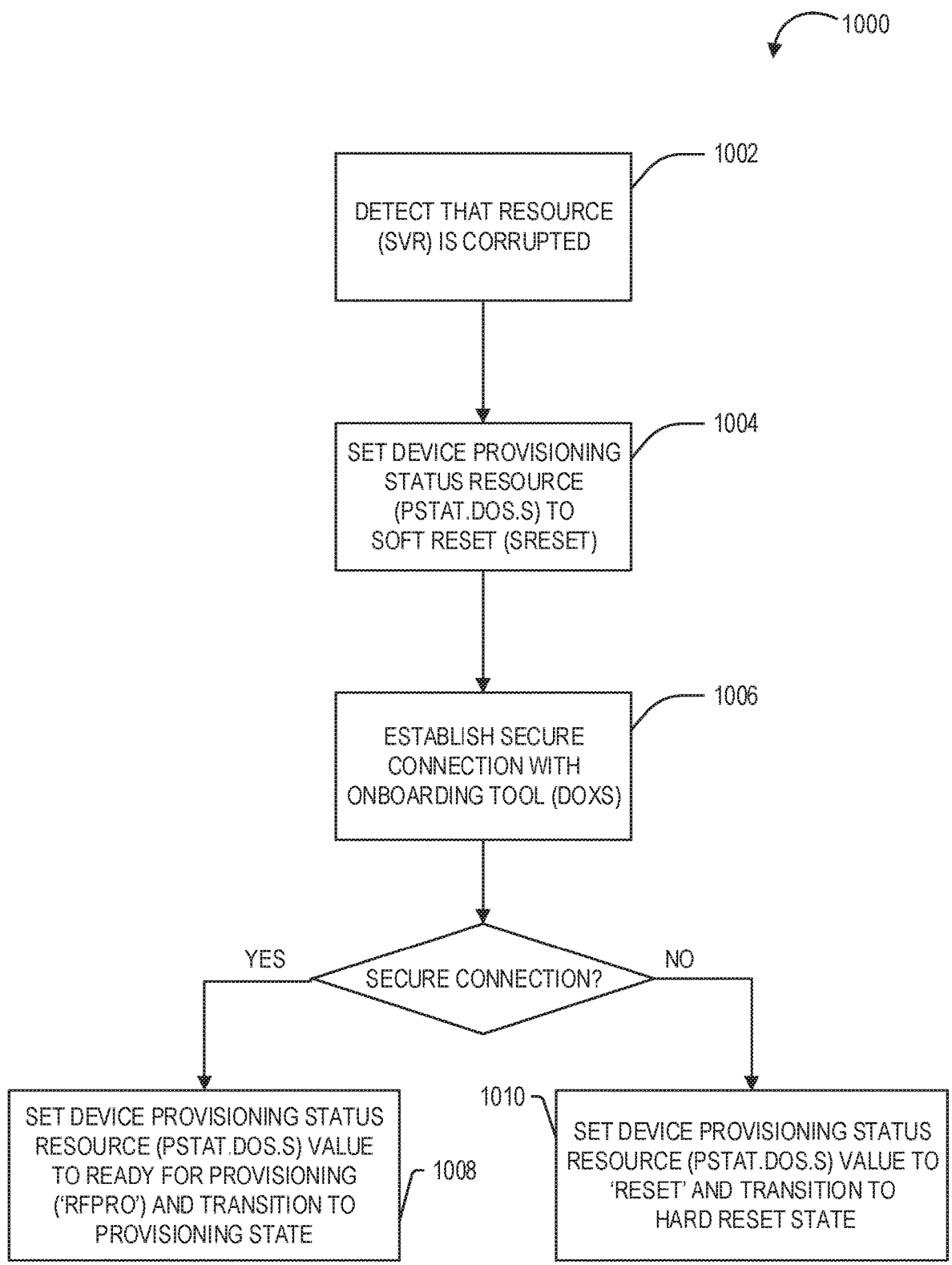
FIG. 10 is a flowchart illustrating a method for transitioning to a soft reset state, according to an embodiment.

FIG. 10 is a flowchart illustrating a method 1000 for transitioning to a soft reset state, according to an embodiment. At block 1002, a server detects that SVRs are corrupted. The pstat.dos.s value is set to "SRESET" to indicate a soft reset state (operation 1004). The server attempts to establish a secure connection with a client with DOXS. (operation 1006). If the secure connection is established, then the pstat.dos.s value is set to "RFPRO" and the server may transition to the ready-for-provisioning state and bypass a hard reset (operation 1008). If instead the SVRs are too corrupted and the secure connection cannot be established, then the pstat.dos.s value is set to "RESET" and the server transitions to a hard reset state (operation 1010).

Figure 11:
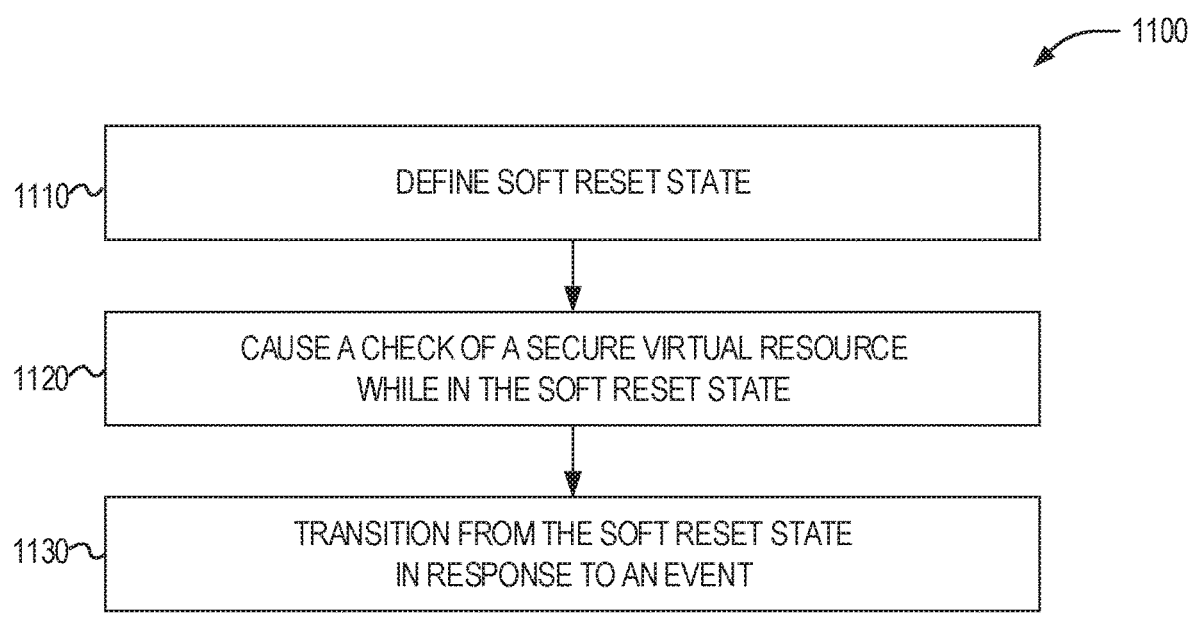
FIG. 11 is a flowchart illustrating a method for transitioning to and operating in a soft reset state, according to an embodiment.

FIG. 11 is a flowchart illustrating a method 1100 of transitioning to and operating in a soft reset state. The following operations are depicted from the perspective of an OCF device acting as a server. However, it will be understood that the techniques of flowchart 1100 may be further adapted from the perspective of a client-side device, an intermediary device, or systems involving both client, server, and intermediate entities.

The method 1100 may be implemented by a server device. At 1110, a soft reset state is defined. In an embodiment, to define the soft reset state a condition is detected and a parameter value is set based on the condition. In a further embodiment, the condition is that a secure virtual resource (SVR) of the server device is corrupted.

In an embodiment, to define the soft reset state, a parameter value of the server device is set by a client service. In a further embodiment, the client service implements an onboarding tool. In a related embodiment, the client service owns a resource provided by the server device.

At 1120, a check of a secure virtual resource (SVR) of the server device is caused to occur while in the soft reset state. In an embodiment, causing the check of the SVR includes checking the SVR at the server device during a state after the soft reset state. In a further embodiment, the state after the soft reset state is a ready for provisioning state.

In an embodiment, causing the check of the SVR includes checking the SVR at a client service during the soft reset state.

At 1130, the server device is transitioned from the soft reset state in response to an event. In an embodiment, the event is a result of a resource consistency check, and the transitioning from the soft reset state in response to the event includes transmitting resources to a client service for the resource consistency check and transitioning to a reset state or ready for provisioning state based on the resource consistency check.

In an embodiment, the event is a result of a credential check, and the transitioning from the soft reset state in response to the event includes performing the credential check on a credential of an owner of the device and transitioning to a reset state when the credential check fails. In a further embodiment, the credential check fails when the credential cannot be found or is determined to be corrupted.

In an embodiment, the method 1100 includes operating using client-directed instructions, while in the soft reset state.

In other examples, the operations and functionality described above with reference to FIGS. 3 to 11 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 12:
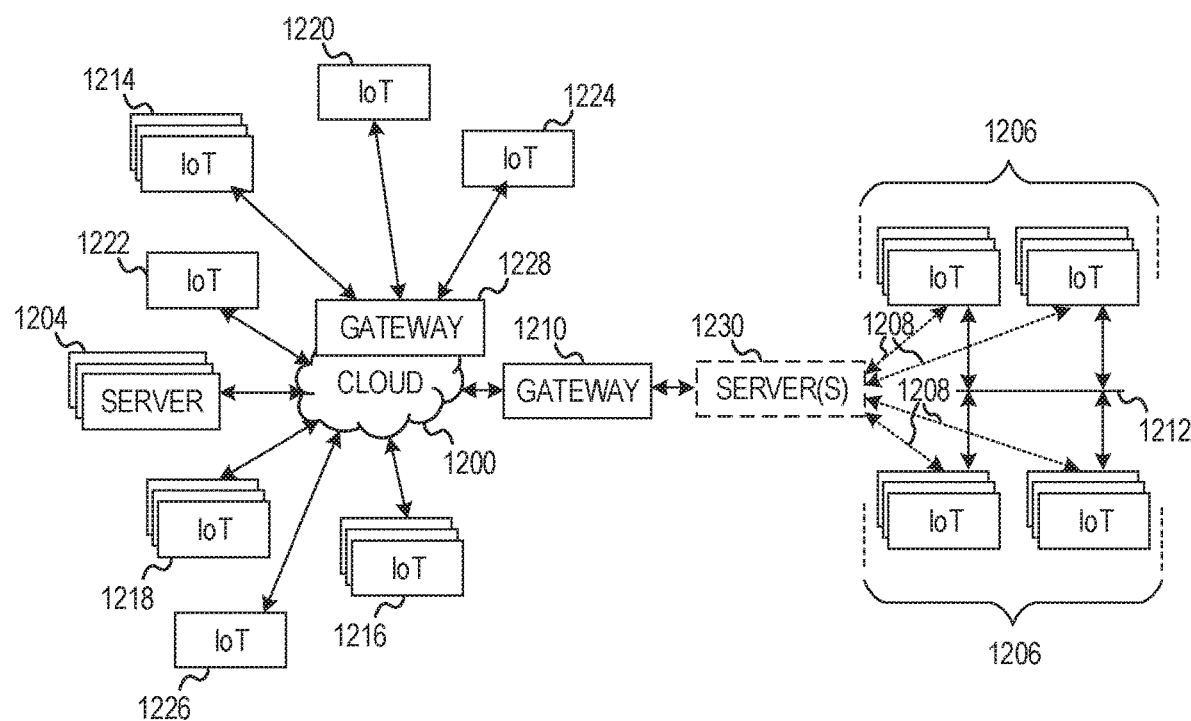
FIG. 12 illustrates a block diagram of a network illustrating communications among a number of IoT devices, according to an example.

FIG. 12 illustrates a drawing of a cloud computing network, or cloud 1200, in communication with a number of Internet of Things (IoT) devices. The cloud 1200 may represent the Internet, or may be a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, optical links, and the like. Further, a wired or wireless sub-network 1212 may allow the IoT devices to communicate with each other, such as through a local area network, a wireless local area network, and the like. The IoT devices may use another device, such as a gateway 1210 or 1228 to communicate with remote locations such as the cloud 1200; the IoT devices may also use one or more servers 1230 to facilitate communication with the cloud 1200 or with the gateway 1210. For example, the one or more servers 1230 may operate as an intermediate network node to support a local edge cloud or fog implementation among a local area network. Further, the gateway 1228 that is depicted may operate in a cloud-to-gateway-to-many edge devices configuration, such as with the various IoT devices 1214, 1220, 1224 being constrained or dynamic to an assignment and use of resources in the cloud 1200.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT fog device or system (not shown, but depicted in FIG. 2), or a combination therein. The groups of IoT devices may be deployed in various residential, commercial, and industrial settings (including in both private or public environments).

As may be seen from FIG. 12, a large number of IoT devices may be communicating through the cloud 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a fog device or system (e.g., as described above with reference to FIG. 2).

Figure 13:
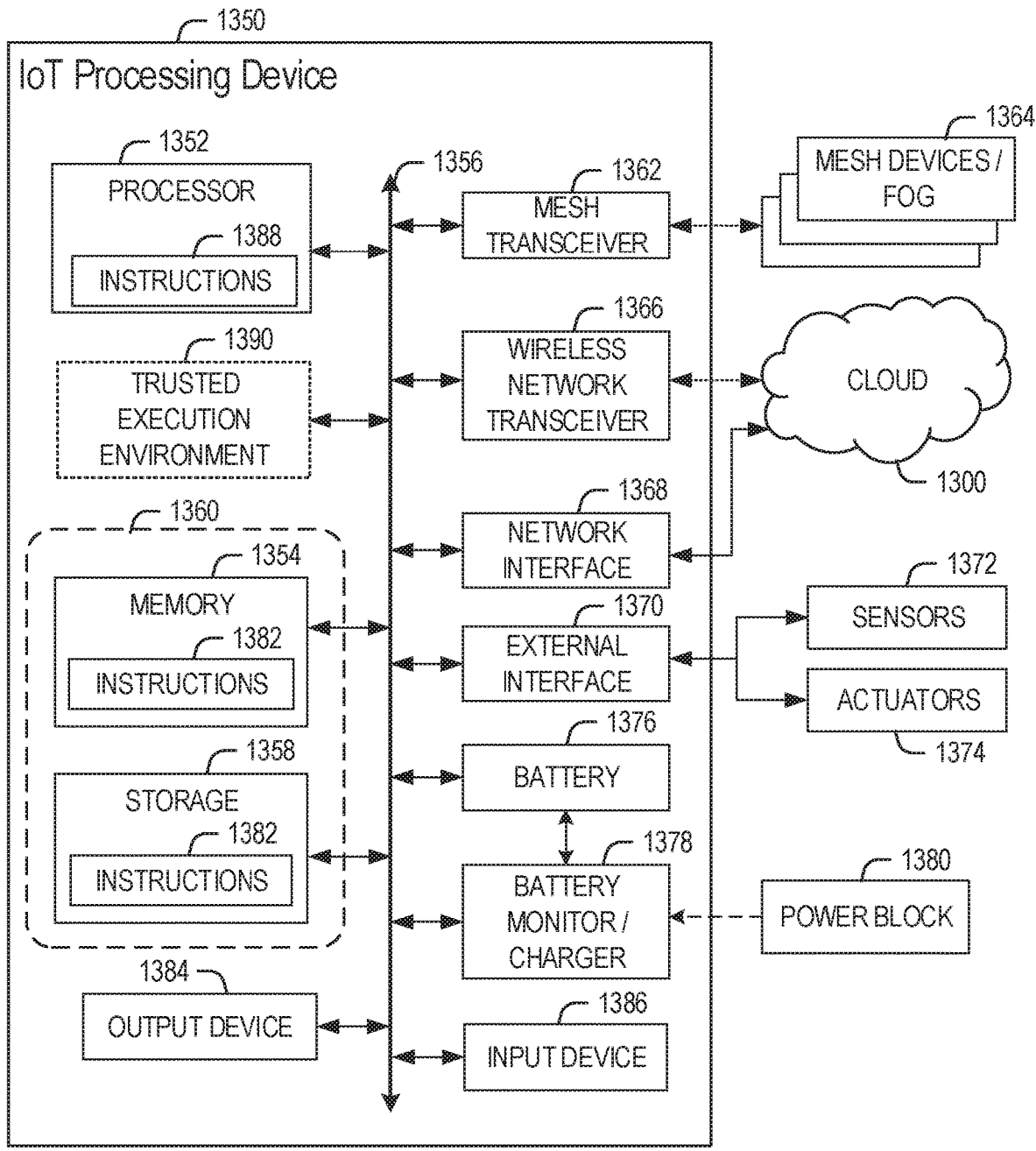
FIG. 13 illustrates a block diagram for an example IoT processing system architecture upon which any one or more of the techniques (e.g., operations, processes, methods, and methodologies) discussed herein may be performed, according to an example.

FIG. 13 is a block diagram of an example of components that may be present in an IoT device 1350 for implementing the techniques described herein. The IoT device 1350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1350, or as components otherwise incorporated within a chassis of a larger system. Additionally, the block diagram of FIG. 13 is intended to depict a high-level view of components of the IoT device 1350. However, some of the components shown may be omitted, additional components may be present, and different arrangement of the components shown may occur in other implementations.

The IoT device 1350 may include a processor 1352, which may be a microprocessor, a multi-core processor, a multithreaded processor, an ultra-low voltage processor, an embedded processor, or other known processing element. The processor 1352 may be a part of a system on a chip (SoC) in which the processor 1352 and other components are formed into a single integrated circuit, or a single package, such as the Edison™ or Galileo™ SoC boards from Intel. As an example, the processor 1352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif. a MIPS-based design from MIPS Technologies, Inc. of Sunnyvale, Calif., an ARM-based design licensed from ARM Holdings, Ltd. or customer thereof, or their licensees or adopters. The processors may include units such as an A5-A0 processor from Apple® Inc., a Snapdragon™ processor from Qualcomm® Technologies, Inc., or an OMAP™ processor from Texas Instruments, Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules. e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example the storage 1358 may be implemented via a solid state disk drive (SSDD). Other devices that may be used for the storage 1358 include flash memory cards, such as SD cards, microSD cards, xD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in a SoC based system. Other bus systems may be included, such as an 12C interface, an SPI interface, point to point interfaces, and a power bus, among others.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at different range. For example, the IoT device 1350 may communicate with close devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1366 may be included to communicate with devices or services in the cloud 1300 via local or wide area network protocols. The wireless network transceiver 1366 may be a LPWA transceiver that follows the IEEE 802.15.4, or IEEE 802.15.4g standards, among others. The IoT device 1350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox. and other technologies. Further, other communications techniques, such as time-slotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1362 and 1366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection, or may be based on other types of networks, such as Controller Area Network (CAN). Local Interconnect Network (LIN), DeviceNet, ControlNet, Data Highway+, PROFIBUS, or PROFINET, among many others. An additional NIC 1368 may be included to allow connect to a second network, for example, a NIC 1368 providing communications to the cloud over Ethernet, and a second NIC 1368 providing communications to other devices over another type of network.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the IoT device 1350 to actuators 1374, such as power switches, valve actuators, an audible sound generator, a visual warning device, and the like.

In some optional examples, various input/output (I/O) devices may be present within, or connected to, the IoT device 1350. For example, a display or other output device 1384 may be included to show information, such as sensor readings or actuator position. An input device 1386, such as a touch screen or keypad may be included to accept input. An output device 1386 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1350.

A battery 1376 may power the IoT device 1350, although in examples in which the IoT device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the IoT device 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 1378 may communicate the information on the battery 1376 to the processor 1352 over the interconnect 1356. The battery monitor/charger 1378 may also include an analog-to-digital (ADC) convertor that allows the processor 1352 to directly monitor the voltage of the battery 1376 or the current flow from the battery 1376. The battery parameters may be used to determine actions that the IoT device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the IoT device 1350. A wireless battery charging circuit, such as an LTC4020 chip from Linear Technologies of Milpitas, Calif. among others, may be included in the battery monitor/charger 1378. The specific charging circuits chosen depend on the size of the battery 1376, and thus, the current required. The charging may be performed using the Airfuel standard promulgated by the Airfuel Alliance, the Qi wireless charging standard promulgated by the Wireless Power Consortium. or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine readable medium 1360 including code to direct the processor 1352 to perform electronic operations in the IoT device 1350. The processor 1352 may access the non-transitory, machine readable medium 1360 over the interconnect 1356. For instance, the non-transitory, machine readable medium 1360 may be embodied by devices described for the storage 1358 of FIG. 13 or may include specific storage units such as optical disks, flash drives, or any number of other hardware devices. The non-transitory, machine readable medium 1360 may include, provide, or invoke instructions 1388 to direct the processor 1352 to perform a specific sequence or flow of actions, for example, as described with respect to the flowchart(s) and block diagram(s) of operations and functionality depicted above.

In still a specific example, the instructions 1388 on the processor 1352 (separately, or in combination with the instructions 1388 of the machine readable medium 1360) may configure execution or operation of a trusted execution environment (TEE) 1390. In an example, the TEE 1390 operates as a protected area accessible to the processor 1352 for secure execution of instructions and secure access to data. Various implementations of the TEE 1390, and an accompanying secure area in the processor 1352 or the memory 1354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1350 through the TEE 1390 and the processor 1352.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a server device comprising: processing circuitry; and at least one storage device including instructions embodied thereon, wherein the instructions, which when executed by the processing circuitry, configure the processing circuitry to perform operations of a soft reset operation, the operations to: define a soft reset state; cause a check of a secure virtual resource (SVR) of the server device, while in the soft reset state; and transition from the soft reset state in response to an event.

In Example 2, the subject matter of Example 1 includes, wherein the instructions to define the soft reset state the server device include instructions, which when executed by the processing circuitry, cause the processing circuitry to detect a condition and set a parameter value based on the condition.

In Example 3, the subject matter of Example 2 includes, wherein the condition is that a secure virtual resource (SVR) of the server device is corrupted.

In Example 4, the subject matter of Examples 1-3 includes, wherein to define the soft reset state, a parameter value of the server device is set by a client service.

In Example 5, the subject matter of Example 4 includes, wherein the client service implements an onboarding tool.

In Example 6, the subject matter of Examples 4-5 includes, wherein the client service owns a resource provided by the server device.

In Example 7, the subject matter of Examples 1-6 includes, instructions, which when executed by the processing circuitry, cause the processing circuitry to operate using client-directed instructions.

In Example 8, the subject matter of Examples 1-7 includes, wherein the instructions to cause the check of the SVR of the server device include instructions, which when executed by the processing circuitry, cause the processing circuitry to check the SVR at the server device during a state after the soft reset state.

In Example 9, the subject matter of Example 8 includes, wherein the state after the soft reset state is a ready for provisioning state.

In Example 10, the subject matter of Examples 1-9 includes, wherein the instructions to cause the check of the SVR of the server device include instructions, which when executed by the processing circuitry, cause the processing circuitry to check the SVR of the server device at a client service during the soft reset state.

In Example 11, the subject matter of Examples 1-10 includes, wherein the event is a result of a resource consistency check, and the instructions to transition from the soft reset state in response to the event include instructions, which when executed by the processing circuitry, cause the processing circuitry to: transmit resources to a client service for the resource consistency check; and transition to a reset state or ready for provisioning state based on the resource consistency check.

In Example 12, the subject matter of Examples 1-11 includes, wherein the event is a result of a credential check, and wherein the instructions to transition from the soft reset state in response to the event include instructions, which when executed by the processing circuitry, cause the processing circuitry to: perform the credential check on a credential of an owner of the server device; and transition to a reset state when the credential check fails.

In Example 13, the subject matter of Example 12 includes, wherein the credential check fails when the credential cannot be found or is determined to be corrupted.

Example 14 is a method implemented by a server device, the method comprising: defining a soft reset state; causing a check of a secure virtual resource (SVR) of the server device, while in the soft reset state; and transitioning from the soft reset state in response to an event.

In Example 15, the subject matter of Example 14 includes, wherein defining the soft reset state further comprises detecting a condition and set a parameter value based on the condition.

In Example 16, the subject matter of Example 15 includes, wherein the condition is that a secure virtual resource (SVR) of the server device is corrupted.

In Example 17, the subject matter of Examples 14-16 includes, wherein to define the soft reset state, a parameter value of the server device is set by a client service.

In Example 18, the subject matter of Example 17 includes, wherein the client service implements an onboarding tool.

In Example 19, the subject matter of Examples 17-18 includes, wherein the client service owns a resource provided by the server device.

In Example 20, the subject matter of Examples 14-19 includes, operating using client-directed instructions, while in the soft reset state.

In Example 21, the subject matter of Examples 14-20 includes, wherein causing the check of the SVR includes checking the SVR at the server device during a state after the soft reset state.

In Example 22, the subject matter of Example 21 includes, wherein the state after the soft reset state is a ready for provisioning state.

In Example 23, the subject matter of Examples 14-22 includes, wherein causing the check of the SVR includes checking the SVR at a client service during the soft reset state.

In Example 24, the subject matter of Examples 14-23 includes, wherein the event is a result of a resource consistency check, and transitioning from the soft reset state in response to the event comprises: transmitting resources to a client service for the resource consistency check; and transitioning to a reset state or ready for provisioning state based on the resource consistency check.

In Example 25, the subject matter of Examples 14-24 includes, wherein the event is a result of a credential check, and transitioning from the soft reset state in response to the event comprises: performing the credential check on a credential of an owner of the server device; and transitioning to a reset state when the credential check fails.

In Example 26, the subject matter of Example 25 includes, wherein the credential check fails when the credential cannot be found or is determined to be corrupted.

Example 27 is at least one machine readable medium including instructions, which when executed by device hardware, cause the device hardware to perform or implement any of the methods of Examples 14-26.

Example 28 is an apparatus comprising means for performing any of the methods of Examples 14-26.

Example 29 is at least one storage device including instructions embodied thereon, wherein the instructions, which when executed by processing circuitry of a server device, configure the processing circuitry to perform operations of a soft reset operation of the server device, the operations to: define a soft reset state; cause a check of a secure virtual resource (SVR) of the server device, while in the soft reset state; and transition from the soft reset state in response to an event.

In Example 30, the subject matter of Example 29 includes, wherein the instructions to define the soft reset state the at least one storage device include instructions, which when executed by the processing circuitry, cause the processing circuitry to detect a condition and set a parameter value based on the condition.

In Example 31, the subject matter of Example 30 includes, wherein the condition is that a secure virtual resource (SVR) of the server device is corrupted.

In Example 32, the subject matter of Examples 29-31 includes, wherein to define the soft reset state, a parameter value of the server device is set by a client service.

In Example 33, the subject matter of Example 32 includes, wherein the client service implements an onboarding tool.

In Example 34, the subject matter of Examples 32-33 includes, wherein the client service owns a resource provided by the server device.

In Example 35, the subject matter of Examples 29-34 includes, instructions, which when executed by the processing circuitry, cause the processing circuitry to operate using client-directed instructions.

In Example 36, the subject matter of Examples 29-35 includes, wherein the instructions to cause the check of the SVR of the server device include instructions, which when executed by the processing circuitry, cause the processing circuitry to check the SVR at the server device during a state after the soft reset state.

In Example 37, the subject matter of Example 36 includes, wherein the state after the soft reset state is a ready for provisioning state.

In Example 38, the subject matter of Examples 29-37 includes, wherein the instructions to cause the check of the SVR of the server device include instructions, which when executed by the processing circuitry, cause the processing circuitry to check the SVR of the server device at a client service during the soft reset state.

In Example 39, the subject matter of Examples 29-38 includes, wherein the event is a result of a resource consistency check, and the instructions to transition from the soft reset state in response to the event include instructions, which when executed by the processing circuitry, cause the processing circuitry to: transmit resources to a client service for the resource consistency check; and transition to a reset state or ready for provisioning state based on the resource consistency check.

In Example 40, the subject matter of Examples 29-39 includes, wherein the event is a result of a credential check, and wherein the instructions to transition from the soft reset state in response to the event include instructions, which when executed by the processing circuitry, cause the processing circuitry to: perform the credential check on a credential of an owner of the server device; and transition to a reset state when the credential check fails.

In Example 41, the subject matter of Example 40 includes, wherein the credential check fails when the credential cannot be found or is determined to be corrupted.

Example 42 is an apparatus, comprising: means for defining a soft reset state; means for causing a check of a secure virtual resource (SVR) of the apparatus, while in the soft reset state; and means for transitioning from the soft reset state in response to an event.

In Example 43, the subject matter of Example 42 includes, means for detecting a condition and means for setting a parameter value based on the condition.

In Example 44, the subject matter of Example 43 includes, wherein the condition is that a secure virtual resource (SVR) of the apparatus is corrupted.

In Example 45, the subject matter of Examples 42-44 includes, wherein to define the soft reset state, a parameter value of the apparatus is set by a client service.

In Example 46, the subject matter of Example 45 includes, wherein the client service implements an onboarding tool.

In Example 47, the subject matter of Examples 45-46 includes, wherein the client service owns a resource provided by the apparatus.

In Example 48, the subject matter of Examples 42-47 includes, means for operating using client-directed instructions, while in the soft reset state.

In Example 49, the subject matter of Examples 42-48 includes, wherein the means for causing the check of the SVR includes means for checking the SVR at the apparatus during a state after the soft reset state.

In Example 50, the subject matter of Example 49 includes, wherein the state after the soft reset state is a ready for provisioning state.

In Example 51, the subject matter of Examples 42-50 includes, wherein the means for causing the check of the SVR includes means for checking the SVR at a client service during the soft reset state.

In Example 52, the subject matter of Examples 42-51 includes, wherein the event is a result of a resource consistency check, and the means for transitioning from the soft reset state in response to the event comprises: means for transmitting resources to a client service for the resource consistency check; and means for transitioning to a reset state or ready for provisioning state based on the resource consistency check.

In Example 53, the subject matter of Examples 42-52 includes, wherein the event is a result of a credential check, and the means for transitioning from the soft reset state in response to the event comprises: means for performing the credential check on a credential of an owner of the apparatus; and means for transitioning to a reset state when the credential check fails.

In Example 54, the subject matter of Example 53 includes, wherein the credential check fails when the credential cannot be found or is determined to be corrupted.

Example 55 is a device fog adapted to perform the operations of any of Examples 1 to 54.

Example 56 is a cloud service server adapted to perform the operations of a cloud service invoked by any of Examples 1 to 54.

Example 57 is an edge computing device adapted to perform the operations of a client device invoked by any of Examples 1 to 54.

Example 58 is a device onboarding service server adapted to perform the operations of onboarding invoked by any of Examples 1 to 54.

Example 59 is an Open Connectivity Foundation (OCF) device, configured as a server, client, or intermediary according to an OCF specification, comprising means to implement the operations of any of Examples 1 to 54.

Example 60 is an Internet of Things (IoT) network topology, the IoT network topology comprising respective communication links adapted to perform communications for the operations of any of Examples 1 to 54.

Example 61 is a network comprising respective devices and device communication mediums for performing any of the operations of Examples 1 to 54.

Example 62 is an apparatus comprising means for performing any of the operations of Examples 1 to 54.

Example 63 is a system to perform the operations of any of Examples 1 to 62.

Example 64 is a method to perform the operations of any of Examples 1 to 62.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A server device, comprising:
    processing circuitry; and
    at least one storage device including instructions embodied thereon, wherein the instructions, which when executed by the processing circuitry, configure the processing circuitry to perform operations of a soft reset operation, the operations to:
    define a soft reset state in response to detection of corruption of at least a portion of a secure virtual resource (SVR) of the server device, wherein the soft reset state is defined by setting a parameter value of the server device;
    cause a check of the SVR of the server device, while in the soft reset state; and
    transition from the soft reset state in response to an event.

2. The server device of claim 1, wherein the parameter value is based on at least one condition including the corruption of the SVR.

3. The server device of claim 1, wherein to define the soft reset state, the parameter value of the server device is set by a client service operating at a client device.

4. The server device of claim 3, wherein the client service implements an onboarding tool.

5. The server device of claim 3, wherein the client service owns a resource provided by the server device.

6. The server device of claim 1, further comprising instructions, which when executed by the processing circuitry, cause the processing circuitry to operate using client-directed instructions.

7. The server device of claim 1, wherein the instructions to cause the check of the SVR of the server device include instructions, which when executed by the processing circuitry, cause the processing circuitry to check the SVR at the server device during a state after the soft reset state.

8. The server device of claim 7, wherein the state after the soft reset state is a ready for provisioning state.

9. The server device of claim 1, wherein the instructions to cause the check of the SVR of the server device include instructions, which when executed by the processing circuitry, cause the processing circuitry to check the SVR of the server device, using a client service operating at a client device, during the soft reset state.

10. The server device of claim 1, wherein the event is a result of a resource consistency check, and the instructions to transition from the soft reset state in response to the event include instructions, which when executed by the processing circuitry, cause the processing circuitry to:
transmit resources to a client service operating at a client device for the resource consistency check; and
transition to a reset state or ready for provisioning state based on the resource consistency check.

11. The server device of claim 1, wherein the event is a result of a credential check, and wherein the instructions to transition from the soft reset state in response to the event include instructions, which when executed by the processing circuitry, cause the processing circuitry to:
perform the credential check on a credential of an owner of the server device; and
transition to a reset state when the credential check fails.

12. The server device of claim 11, wherein the credential check fails when the credential cannot be found or is determined to be corrupted.

13. A method implemented by a server device, the method comprising:
defining a soft reset state in response to detection of corruption of at least a portion of a secure virtual resource (SVR) of the server device, wherein the soft reset state is defined by setting a parameter value of the server device;
causing a check of the SVR of the server device, while in the soft reset state; and
transitioning from the soft reset state in response to an event.

14. The method of claim 13, wherein the parameter value is based on at least one condition including the corruption of the SVR.

15. The method of claim 13, wherein to define the soft reset state, the parameter value of the server device is set by a client service operating at a client device.

16. The method of claim 15, wherein the client service implements an onboarding tool, and wherein the client service owns a resource provided by the server device.

17. The method of claim 13, further comprising operating using client-directed instructions, while in the soft reset state.

18. The method of claim 13, wherein causing the check of the SVR includes checking the SVR at the server device during a state after the soft reset state.

19. The method of claim 18, wherein the state after the soft reset state is a ready for provisioning state.

20. The method of claim 13, wherein causing the check of the SVR includes checking the SVR, using a client service operating at a client device, during the soft reset state.

21. The method of claim 13, wherein the event is a result of a resource consistency check, and transitioning from the soft reset state in response to the event comprises:
transmitting resources to a client service operating at a client device for the resource consistency check; and
transitioning to a reset state or ready for provisioning state based on the resource consistency check.

22. The method of claim 13, wherein the event is a result of a credential check, and transitioning from the soft reset state in response to the event comprises:
performing the credential check on a credential of an owner of the server device; and
transitioning to a reset state when the credential check fails;
wherein the credential check fails when the credential cannot be found or is determined to be corrupted.

23. An apparatus, comprising:
means for defining a soft reset state in response to detection of corruption of at least a portion of a secure virtual resource (SVR) of the apparatus, wherein the soft reset state is defined by setting a parameter value of the apparatus;
means for causing a check of the SVR of the apparatus, while in the soft reset state; and
means for transitioning from the soft reset state in response to an event.

24. The apparatus of claim 23, wherein to define the soft reset state, the parameter value of the apparatus is set by a client service operating at a client device.

25. The apparatus of claim 23, wherein to check the SVR includes checking the SVR, using a client service operating at a client device, during the soft reset state.

26. The apparatus of claim 23, wherein the event is a result of a resource consistency check, and wherein the apparatus further comprises:
means for transmitting resources to a client service operating at a client device for the resource consistency check; and
means for transitioning to a reset state or ready for provisioning state based on the resource consistency check.

27. The apparatus of claim 23, wherein the event is a result of a credential check, and wherein the apparatus further comprises:
means for performing the credential check on a credential of an owner of the apparatus; and
means for transitioning to a reset state when the credential check fails.

* * * * *